(12) United States Patent
Shah Heydari et al.

(10) Patent No.: US 9,590,892 B2
(45) Date of Patent: Mar. 7, 2017

(54) PROACTIVE CONTROLLER FOR FAILURE RESILIENCY IN COMMUNICATION NETWORKS

(71) Applicants: Shahram Shah Heydari, Oshawa (CA); Alireza Izaddoost, Toronto (CA)

(72) Inventors: Shahram Shah Heydari, Oshawa (CA); Alireza Izaddoost, Toronto (CA)

(73) Assignee: UNIVERSITY OF ONTARIO INSTITUTE OF TECHNOLOGY, Oshawa, Ontario (CA)

( * ) Notice: Subject to any disclaimer, the term of this patent is extended or adjusted under 35 U.S.C. 154(b) by 161 days.

(21) Appl. No.: 14/558,174

(22) Filed: Dec. 2, 2014

(65) Prior Publication Data

US 2015/0195190 A1    Jul. 9, 2015

Related U.S. Application Data

(60) Provisional application No. 61/910,637, filed on Dec. 2, 2013.

(51) Int. Cl.
| | | |
|---|---|---|
| *G06F 11/00* | (2006.01) | |
| *H04L 12/707* | (2013.01) | |
| *G06F 11/30* | (2006.01) | |
| *H04L 12/703* | (2013.01) | |
| *H04L 12/24* | (2006.01) | |
| *H04L 12/717* | (2013.01) | |

(52) U.S. Cl.
CPC ............... *H04L 45/22* (2013.01); *G06F 11/30* (2013.01); *H04L 41/0668* (2013.01); *H04L 41/147* (2013.01); *H04L 45/28* (2013.01); *H04L 45/42* (2013.01)

(58) Field of Classification Search
CPC ............. G06F 11/2002; G06F 11/2005; G06F 11/2007; G06F 11/2023; G06F 11/30; G06F 11/3006; G06F 11/3051
See application file for complete search history.

(56) References Cited

U.S. PATENT DOCUMENTS

| | | | |
|---|---|---|---|
| 8,050,182 B2* | 11/2011 | Yamamoto | H04L 41/0677 370/242 |
| 8,869,035 B2* | 10/2014 | Banerjee | H04L 41/12 715/733 |
| 9,197,495 B1* | 11/2015 | Rauser | H04L 41/0677 |

(Continued)

OTHER PUBLICATIONS

B. Bassiri and S. Shah Heydari, "Network survivability in large-scale regional failure scenarios," presented at the Proceedings of the 2nd Canadian Conference on Computer Science and Software Engineering, Montreal, Quebec, Canada, 2009.

(Continued)

*Primary Examiner* — Charles Ehne
(74) *Attorney, Agent, or Firm* — Norton Rose Fulbright Canada LLP; Maya Medeiros

(57) ABSTRACT

Network devices and systems relating to prevention of large-scale network failure and determining a probability of a large-scale network failure for a network. The network devices may control rerouting of network traffic from failed network paths to preventative paths with probabilities of failure below determined thresholds. The network devices monitor and process real time data for dynamic and proactive rerouting when large-scale network failure occurs or is likely to occur.

20 Claims, 11 Drawing Sheets

(56) References Cited

U.S. PATENT DOCUMENTS 9,210,038 B1 * 12/2015 Rauser ............... H04L 41/0677

OTHER PUBLICATIONS

M. Kiese, V. Marcheva, J. Eberspacher, and D. Schupke, "Diverse routing based on shared risk link groups," in Design of Reliable Communication Networks, 2009. DRCN 2009. 7th International Workshop on, 2009, pp. 153-159.

J. P. G. Sterbenz, D. Hutchison, E. K. Ç etinkaya, A. Jabbar, J. P. Rohrer, M. Schöller, and P. Smith, "Resilience and survivability in communication networks: Strategies, principles, and survey of disciplines," Computer Networks, vol. 54, pp. 1245-1265, 2010.

L. Hyang-Won, E. Modiano, and L. Kayi, "Diverse Routing in Networks With Probabilistic Failures," Networking, IEEE/ACM Transactions on, vol. 18, pp. 1895-1907, 2010.

W. Xiaoliang, J. Xiaohong, and A. Pattavina, "Assessing network vulnerability under probabilistic region failure model," in High Performance Switching and Routing (HPSR), 2011 IEEE 12th International Conference on, 2011, pp. 164-170.

P. K. Agarwal, A. Efrat, S. K. Ganjugunte, D. Hay, S. Sankararaman, and G. Zussman, "Network vulnerability to single, multiple, and probabilistic physical attacks," in Military Communications Conference, 2010—MILCOM 2010, 2010, pp. 1824-1829.

S. Neumayer and E. Modiano, "Network Reliability With Geographically Correlated Failures," in INFOCOM, 2010 Proceedings IEEE, 2010, pp. 1-9.

L. Kayi, L. Hyang-Won, and E. Modiano, "Reliability in Layered Networks With Random Link Failures," Networking, IEEE/ACM Transactions on, vol. 19, pp. 1835-1848, 2011.

A. Izaddoost and S. S. Heydari, "A Probabilistic Model for Network Survivability in Large Scale Failure Scenarios," in CCECE'2012 Montreal, Canada, in Process, 2012.

\* cited by examiner

Fig. 7. Preventive rerouting processing time.

PROACTIVE CONTROLLER FOR FAILURE RESILIENCY IN COMMUNICATION NETWORKS

CROSS REFERENCE TO RELATED APPLICATIONS

This application claims the benefit of U.S. Provisional Patent Application No. 61/910,637 filed Dec. 2, 2013, which is incorporated by reference.

FIELD

The improvements generally relate to the field of network communications. The improvements further relate to preventive protection for network failures.

INTRODUCTION OR BACKGROUND

Natural disasters such as earthquakes or power outages may cover a vast area, and the impact of such disasters on the physical infrastructure of the communication network may cause large-scale network failures. Simultaneous damage in several links and nodes of networks may cause substantial loss of information, which can be very costly for governments, subscribers and businesses. For example, the Taiwan earthquake in December 2006 cut several undersea cables at the same time, causing a major communication disruption in part of Asia for several weeks. In this regard, the survivability of critical infrastructure systems in the presence of large-scale failures and continued undisrupted network operations, have become a main concern for communication networks.

Network failure recovery models may focus on single or double link failure. Network failure recovery models may assume that the failures are independent and consecutive failures may not happen at the same time. However, this assumption may not be valid in large scale failure scenarios. For instance, in an earthquake event, the failure may be controlled by the external factors and damage can cover a vast area. This may increase the risk of failure in several network components simultaneously.

Single failure scenarios may be recovered using pre-planned disjoint backup paths. This approach may not be appropriate in large-scale failure scenarios. Although establishing several disjoint backup paths may enhance the chance that at a minimum one of the paths survives, it may significantly increase the cost of network resources.

There exists a need for an improved device, system or method to better manage and minimize the damage inflicted by potential and real large-scale failure of networks, or at least alternatives.

SUMMARY

In accordance with one aspect, there is provided a preventative rerouting process for network controllers, or other re-routing devices. The network controller may continuously monitor network parameters and sensor feedback to re-route traffic flow over the network in a preventative and dynamic way. The network controller may compute an end to end failure probability for all network paths in the network, where each path is made up of links and nodes. The end to end probability of a path from source node to destination node may be dynamically computed based on the probability of failure of its links and nodes. The network controller may compute alternative paths from the source node to the destination node. The network controller may identify preventative paths with lower end to end failure probabilities. The network controller may use upper and lower thresholds to evaluate and select preventative paths. If a network path is within a safe zone range than it may be selected as a preventative path.

In accordance with one aspect, there is provided a network controller for a network of network paths. Each network path is defined by nodes and links. A network interface monitors the network to detect large-scale real time network failure indicia to detect likelihood of a network failure involving one or more network paths. A routing control processor determines, for each link and node of the network, a probability of failure, and, for each failed or likely to fail network path, determine a preventive protection path. The preventive protection path has a lower probability of failure, which is calculated based on the determined probabilities of failure for the links and nodes. The network controller dynamically reroutes network traffic for the failed or likely to fail network path to the preventive protection path.

The routing control processor may be further configured to calculate disaster parameters using data feeds from one or more sensors, and update a probabilistic failure model with the disaster parameters. The routing control processor may be further configured to determine the probability of failure for each node or link of the network using the updated probabilistic failure model. The routing control processor may be further configured to determine a future risk of failure for each network path in the network using the updated probabilistic failure model and the probabilities of failure. The routing control processor may be further configured to mitigate failure impact by rerouting by based on the future risk of failure for each network path.

The routing control processor may be further configured to, for each network path determined to have already failed or likely to fail, calculate a shortest preventative path with a probability of failure less than a threshold limit, and reroute network traffic for the failed or likely to fail network path to the shortest preventative path. The shortest preventative path may have a probability of failure less than an upper threshold limit. The shortest preventative path may have a probability of failure less than an upper threshold limit and a lower threshold limit.

The routing control processor may be further configured to determine an impact area using the detected large-scale real time network failure indicia, determine the probability of failure for each link or node of the network within the impact area, and reroute one or more network paths within the impact area to preventative paths.

The routing control processor may be further configured to update the impact area as failure in a large-scale scenario expands over time, update the probability of failure for each link or node of the network within the updated impact area, and reroute the one or more network paths within the updated impact area to preventative paths.

The routing control processor may be further configured to evaluate network performance by calculating a number of disrupted connections, a disruption time, and a rerouting time for a network failure event.

The routing control processor may be further configured to compute, once network failure is detected or likely, a failure decay rate based on a level of intensity of the network failure and geographical characteristics for the network failure, and determine the probabilities of failure using the failure decay rate.

The routing control processor may be further configured to actively and continuously calculate, for each network path in an impact radius, an end-to-end path failure probability using the probabilities of failure for the links and nodes, and reroute traffic for the network paths based on one or more threshold values and the end-to-end path failure probabilities, whether or not failure is predicted or detected.

The routing control processor may be further configured to calculate for each source node and destination node in the network, a shortest preventative path and reroute network traffic prior to network failure detection.

In another aspect, there is provided a system for preventative network path rerouting that has a network of network paths defined by nodes and link. The system has sensors to monitor the network for large-scale real time network failure indicia. The system has one or more network controllers.

In a further aspect, there is provide a disaster recovery controller in a network of nodes connected by links, wherein the controller is configured to execute the following process in a loop: determine likelihood of occurrence of a large scale failure through communication with a network node or a sensor for disaster detection; compute network failure parameters for range of impact and speed of expansion based on failure indicia received from the network node or the sensor; compute impact area using the network failure parameters to define a set of network paths for rerouting; for each network path, rerouting data flow to a shortest preventative path having a probability of failure less than a threshold limit; and continuously monitoring the network for further failure updates and re-execution of process.

The disaster recovery controller further configured to calculate disaster parameters using data feeds from received from the network node or the sensor, and update a probabilistic failure model with the disaster parameters and network failure parameters; and determine the probability of failure for each node or link of the network using the updated probabilistic failure model.

The disaster recovery controller further configured to, for each network path for rerouting, calculate a shortest preventative path with a probability of failure less than a threshold limit, and reroute network traffic for the network path to the shortest preventative path.

The disaster recovery controller further configured to determine the impact area using the detected large-scale real time network failure indicia, determine the probability of failure for each link or node of the network within the impact area, and reroute one or more network paths within the impact area to preventative paths.

The disaster recovery controller further configured to evaluate network performance by calculating a number of disrupted connections, a disruption time, and a rerouting time for a network failure event.

The disaster recovery controller further configured to compute, once network failure is detected or likely, a failure decay rate based on a level of intensity of the network failure and geographical characteristics for the network failure, and determine the probabilities of failure using the failure decay rate.

Many further features and combinations thereof concerning embodiments described herein will appear to those skilled in the art following a reading of the instant disclosure.

DESCRIPTION OF THE FIGURES

In the figures.

DETAILED DESCRIPTION

Figure 1:
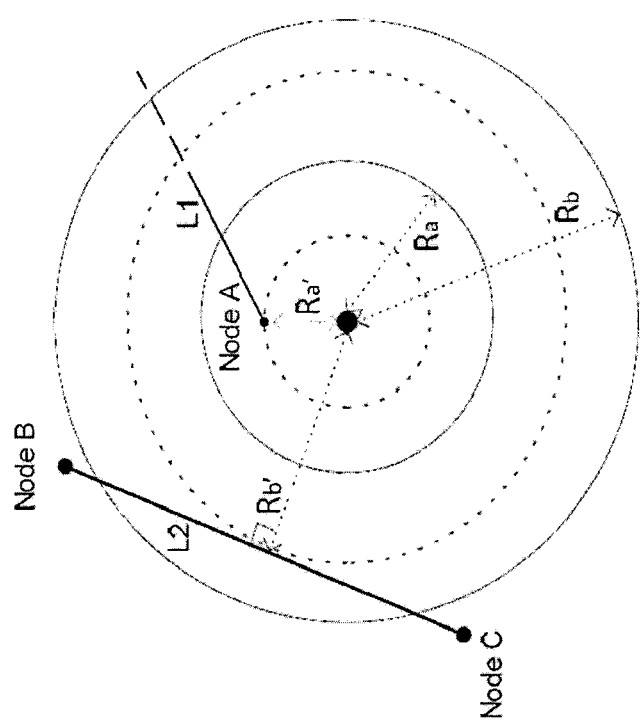
FIG. 1 is a view of an example of a network with crossing link and an impacted node according to some embodiments.

Embodiments described herein relate to systems and methods for providing preventive protection of networks based on a probabilistic model for large-scale network failures. Embodiments described herein relate to a proactive dynamic connection or network controller for large-scale failure resiliency in communication networks.

Embodiments described herein may address large-scale failure scenarios using a dynamic response that may allow for salvaging as much network traffic as possible and rerouting the affected traffic using the available paths in the post-failure network.

Embodiments described herein may consider the characteristics of the large-scale failure and use a restoration technique as an appropriate approach to enhance network resiliency.

IP routing protocols may compute alternative paths and reroute traffic in failure scenarios. However, they may not be feasible in large-scale failure cases due to the slow process of IP-layer rerouting. To reduce required network restoration time and reroute traffic as fast as possible, recovery approaches may be applied to the IO network backbone, where routing mostly relies on methods such as Multiprotocol Label Switching (MPLS) or Wavelength-Division Multiplexing (WDM) light paths. Development and deployment of Software-Defined Networks (SDN) may further facilitate implementation and deployment of such recovery schemes in centralized or distributed SDN controllers.

Large-scale deterministic failure scenarios may model the area of damage as circles or lines to study the effect of the disasters and the compromised network components considered completely inoperative. An assumption in deterministic failure models may be that network components will fail with certainty as long as the failure event occurs. However, natural disasters in most large-scale failure events may be probabilistic in nature.

Geographical characteristics and the distance of the components to the centre of the disaster may change the failure probability. Probabilistic failures may be relevant in designing a survivable network in the case of large-scale failures.

Probabilistic failure models may be used to design a survivable network using pre-planned backup paths with minimum mutual failure probability. Joint failure probability may be minimized by formulating the backup path selection as an Integer Non-Linear Problem (INLP). A pre-planned protection mechanism may be costly and may be infeasible in the case of large-scale failures.

Identifying vulnerable locations in the network in the event of probabilistic failure scenarios may be used to redesign connectivity or add extra capacity to improve network resiliency. Network failure models may need to sufficiently model the impact of a large-scale failure event in which failure probability can be considerably high in the epicentre.

For network performance in large-scale failure scenarios a time-varying probabilistic model may be used to study network behaviour in case of failure considering the probabilistic nature in large-scale failure events such as natural disasters. Network performance may improve by reducing the percentage of the lost demands and required spare capacities in a probabilistic approach as compared to the deterministic failure scenarios.

As the damage in a large-scale scenario expands over time, the failure probability and impact area also change with time. In this case, nodes or links far from the source of the disaster may eventually move inside the impact area and fail with a certain probability. Even though it may be possible to reroute failed paths or connections once such failure is detected, at times it may not be enough to simply react once a failure has already happened.

Embodiments described herein may provide an improved system or method to better manage and minimize the damage inflicted by potential and real large-scale failure of networks.

Embodiments described herein may provide a preventive protection method, which may be appropriate for dynamic disaster scenarios such as earthquakes, nuclear explosions, or hurricanes. Embodiments described herein may increase the resilience level of the network by employing preventive rerouting. The preventive protection method may reduce the number of disrupted connections and network disruption time by rerouting traffic from the endangered routes to the more reliable paths prior to failure.

In one aspect, embodiments described herein may be used to improve network performances in the probabilistic failure scenarios. Network performance with different impact ranges and the correlated probability failures varied with time may be evaluated. Embodiments described herein may be extended to different large-scale failure scenarios such as nuclear explosions, earthquakes, hurricanes or floods because of the similarity in damage patterns among them.

Network Model

The network model and probability of failure in large-scale failure scenarios is described herein. A network graph may be G=(V,E) where V is a set of nodes and E is a set of links. A link from node i to node j is represented by $e_{ij}$. A crossing link $e^c_{ij}$ is considered as a link where the end nodes i, j are out of the impact area but parts of the link $e^c_{ij}$ have been impacted.

In a time-varying model, the failure probability tends to vary with time. Let the impact radius at time=t be R. Failure probability of link $e_{ij}$ can be denoted as $P_f^{ij}(R_t) \in [0,1]$ and for node $n_i \in V$ as $P_f^{ni}(R_t) \in [0,1]$.

In wave-like disasters such as earthquakes, the energy of the wave decreases as the distance to the epicentre of the event increases while its intensity is attenuated by the geographic characteristics of the area. Failure probability for each component with impact radius $R_t$ at time t can be generalized as:

$$P_f(R,t) = e^{-\phi(Rt/vt)} \quad (1)$$

A disaster's wave can be assumed to travel with a constant velocity v and the probability of the failure can be reduced with decay rate $\phi$.

In the proposed approach, $R_t$ for a node is the distance R from the epicentre at time t. To compute probability failure for a link ($e_{ij}$ and $e^c_{ij}$), the minimum Euclidean distance from the epicentre to the link is $R_t$. FIG. 1 shows an example that illustrates crossing links and failure probabilities of components.

In FIG. 1, node A is connected to link L1. Impact radius at t=ta is Ra and at t=tb has been extended to Rb. Node A is impacted at t=ta'. The failure probability for Node A and the connected link can be shown as Pf(Rta'). This failure probability is applied to link L1 for further end-to-end path failure probability as discussed herein. The crossing link L2 between node B and C has been impacted at t=tb' at the distance R=Rb' from the epicentre. The closest part of the link impacted by the disaster has been considered to calculate the failure probability of the crossing link. In this example, the failure probability of the crossing link, L2, can be shown as Pf(Rtb').

A proposed approach to improve network reliability in probabilistic large-scale failure scenarios is described herein.

Preventive Protection Scheme in Large-Scale Failure Scenarios

Once network failure is detected or the possibility of a network failure is detected, the appropriate probability failure decay rate can be computed based on the level of intensity of the disaster and available background knowledge of the geographical characteristics. This factor can be employed to calculate failure probability for each component in the network. The steps in the proposed process are described below.

A. End-to-End Path Failure Probability

A single link can survive the impact with a probability of $1-P_f^{ij}(R_t)$. Each path in the network may consist of several links. With the above knowledge, end-to-end path failure probability is computed as:

$$P_f(\text{path}_{(i,j)}) = 1 - \prod_{e_{ij} \in E} (1 - P_f^{ij}(R_t)) \quad (2)$$

B. k-Shortest Paths Failure Probabilities Computation

Depending on the network topology and centre of the disaster, several alternative paths from the source to the destination may be available for each affected connection. In this step, the existing k-shortest paths are computed and the output are sorted with the shortest path first. For each source node i and destination node j we may have a group of shortest paths as:

$$\text{path}(i,j)_1, \text{path}(i,j)_2, \ldots, \text{path}(i,j)_k$$

Using equation (2), the end-to-end probability of failure for each path may be calculated as:

$$P_f(\text{path}_{(i,j)})_1, P_f(\text{path}_{(i,j)})_2, \ldots, P_f(\text{path}_{(i,j)})_k$$

C. Preventive Rerouting Strategy Prior to Failure

Different paths with different failure probabilities may provide a holistic view of the intensity of the approaching failure in the network. Embodiments described herein may use this knowledge to improve network survivability.

Two decision making parameters may be defined: upper threshold and lower threshold. These parameters can be used to make an appropriate decision to switch traffic from the in-danger path prior to failure. Lower threshold can be defined as T_low∈[0,1] and upper threshold defined as T_up∈[0,1]. T_low can define a zone for the paths with lower end-to-end probability of failure, therefore having more chances to survive the impact.

The following expressions may describe the decision making procedure based on the end-to-end path failure probability according to some embodiments:

$$P_f(\text{path}_{(i,j)})_1 \leq T\_low \quad (3)$$

In this situation, the first computed shortest path has a lower failure probability than the lower threshold. This path can be assumed to fall in the safe zone and can be selected as an available backup path to route traffic.

$$i \ P_f(\text{path}_{(i,j)})_1 \geq T\_up \quad (4)$$

If the end-to-end probability of failure is higher than the upper threshold then the path is likely to fail in the future. The proper action may be to find another shortest path in the lower threshold zone and reroute the demands through it. In some embodiments, if the proposed model could not find a path in the lower threshold zone, any path with a lower failure probability than the current path may be selected to reroute the traffic.

$$T\_up < P_f(\text{path}_{(i,j)})_1 < T\_low \quad (5)$$

In this scenario, the first found shortest path remains as the working path. The difference between upper threshold and lower threshold may be selected based on the desired level of survivability and the available resources in the network.

In all of the above scenarios (3), (4) and (5), if the number of available k-shortest paths is one, it may be considered as the best candidate path according to some embodiments. Having several shortest paths may be directly related to the network topology and the failure intensity. In highly damaged networks, more links and nodes will fail and as a result, less network resources will be available to reroute traffic.

Figure 2A:
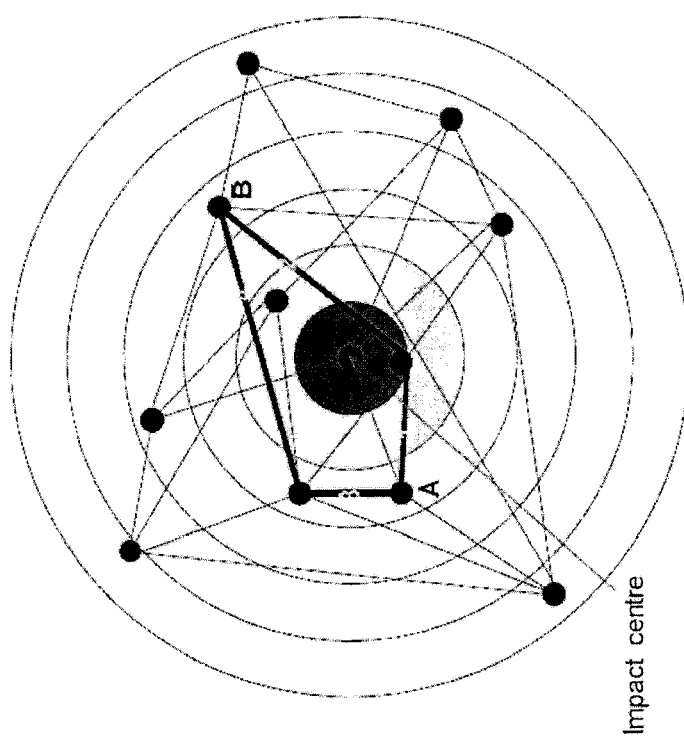
FIG. 2a is a view of an example of a network with expandable failure and k-shortest paths according to some embodiments.

FIG. 2a is an illustration of an expandable disaster model. As shown, there may be several paths available between node A and B, two of which are highlighted. Failure probabilities are illustrated in different shadings for each impact radius and decreases as the impact expands. The path $k_1$ utilizes links 1 and 2 and the alternative path $k_2$ consists of links 3 and 4.

As can be seen, links 1 and 2 in path $k_1$ pass through the area nearest to the impact centre, which results in a higher end-to-end path failure probability. In accordance with the proposed embodiments, based on the defined thresholds, the appropriate action can be to switch demands from A to B through path $k_2$ (links 3 and 4), which has a lower end-to-end failure probability. The switch action should be taken prior to a failure of the current working path.

Figure 2B:
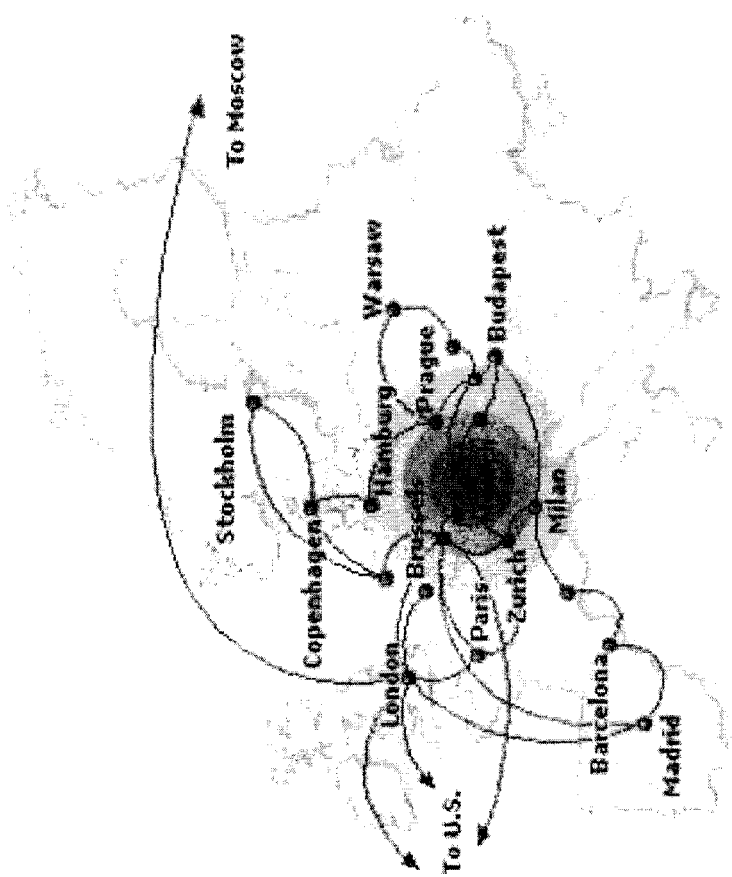
FIG. 2b is a view of an example large-scale failure scenario according to some embodiments.

FIG. 2b illustrates, in one possible embodiment, how the component failures can be dependent in a large-scale failure scenario. Links are depicted as lines, and nodes as single points. As shown, in an example, demolition may start from an epicentre, and cover an area which can be related to the strength of the damage and the physical properties of the area.

D. Performance Metrics

To evaluate the performance of the proposed embodiments, the following metrics may be adopted:

1) The Number of Disrupted connections: undisrupted traffic delivery is a goal to design a reliable network. Any disruption in the network operation can lead to loss of data and impact on the network performance. To ensure continued system operation in the case of a disaster, a dynamic path restoration mechanism attempts to reroute demand of the disrupted connection through a backup path. Embodiments described herein may decrease the number of disrupted connections to improve network survivability.

2) Disruption time: disrupted connections need time to be recovered. For easy of illustration and discussion, MPLS service time model is adopted for computation, as it provides a good model for connection-oriented backbone services. Dynamic restoration time in MPLS networks may be provided by embodiments described herein. In an MPLS-based network, the source node of each flow receives a failure notification message with a delay called notification time. This delay can be negligible for the adjacent nodes to the failed link. When the source node receives the failure notification message, it calculates a new path and setups a new Label Switching Path (LSP) by the signaling protocol. Two types of messages employed in the signaling are Path messages and Reserve (Resv) messages. Embodiments described herein may use backbone infrastructure devices with negligible nodal processing and switching delay. Total disruption time can be calculated as: Notification time+Path messages delay+Resv messages delay.

3) Preventive rerouting time: in accordance with embodiments described herein, the upper and lower thresholds may be applied to compute substitute paths with a desired level of end-to-end failure probability. The process to calculate alternative paths may be implemented by the network controller in the background and may not interfere with the current traffic flow in the network; however it may increase the network processing overhead during the computing process. The above computational time can be directly or indirectly related to how the value of the upper and lower thresholds are adjusted. It may be utilized to improve network performance based on the available resources and the expected resilience level. Preventive rerouting time may be independent of the failure. When the substitute path with the acceptable level of end-to-end failure probability is computed and established by the controller, traffic of the current working path may switched. The switching time can be assumed to be negligible, therefore this operation allowed the traffic between the two nodes flow continuously.

Embodiments described herein may include the following example process:

---
Preventive protection process 1
---
While impact radius < maximum radius
   Compute impact area
   For all components within impact area:
     Add failure probability
     Remove failed nodes and links from the network
     Compute end-to-end path failure for each demand
     Based on upper and lower threshold:
        Reroute failed demands to the preventive paths
        Reroute likely to fail demands to the preventive paths
     Calculate number of disrupted connections
     Calculate network disruption time
     Calculate preventive rerouting time -continued Preventive protection process 1

End For;
Extend impact radius
End while;

Other embodiments described herein may include the following example process:

Preventive protection process 2

While failure_alarm exists
    Estimate disaster parameters (velocity, epicentre, . . .)
    Update probabilistic failure model with disaster parameters
    Calculate probability of failure for each node/link/path within
        the next action period T
    For each end-to-end network path
        If already failed, reroute to a preventive path, if exists
        If end-to-end probability of failure > upper threshold
            Reroute to a preventive path, if exists
        If preventive path does not exist, no preventive action takes
            place
        Collect new failure alarms
End while A network path may be an end-to-end connection between two network nodes, through one or more network links, to satisfy specific customer or system demands.

A preventive path can be determined by the following process:

The shortest end-to-end backup path with (probability of failure<lower threshold)

If no path satisfies, the shortest end-to-end backup path with (probability of failure<upper threshold)

If still no path satisfies, no preventive path is chosen.

Performance Results

Figure 3:
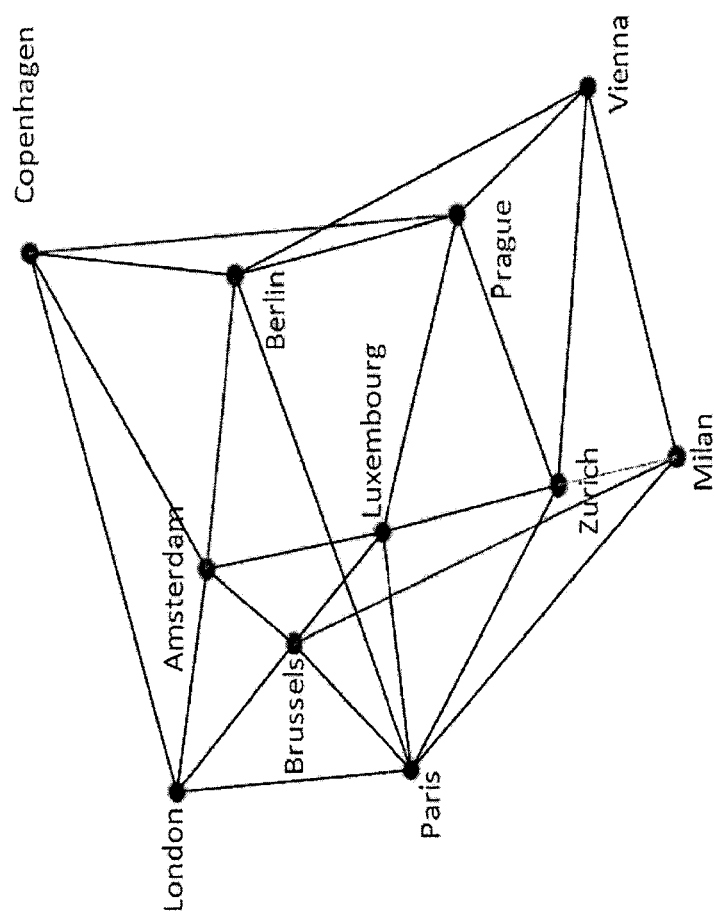
FIG. 3 shows a graph of network topology according to some embodiments.

As an illustrative example, in accordance with some embodiments the proposed process can be applied to an example European network COST-239 (FIG. 3) to evaluate the network performance in probabilistic large-scale failure scenarios. The network consists of 11 nodes with an average nodal 4.3 and 26 links. Using coordinate vector, for example, the geographical location may be determined and an adjacency matrix may indicate the connection between nodes.

The proposed method can be simulated in two different scenarios called Greedy Prevention (denoted by GP) and Moderate Prevention (denoted by MP). Each scenario has different threshold sets to evaluate network performance. Dynamic Path Restoration (denoted by DPS) can refer to the large-scale probabilistic failure model without a preventive rerouting process and Preventive Path Protection (denoted by PPP) can refer to embodiments implementing a preventive rerouting process. Path restoration in DPS may be performed through the first found shortest path using Dijkstra's algorithm, for example. Table I shows simulation parameters in different scenarios.

TABLE I

SIMULATION PARAMETERS

| Scenario | Decay rate (φ) | Upper threshold | Lower threshold |
|---|---|---|---|
| Moderate Prevention | 0.01783 | 75% | 50% |
| Greedy Prevention | 0.01783 | 50% | 25% |

Figure 4:
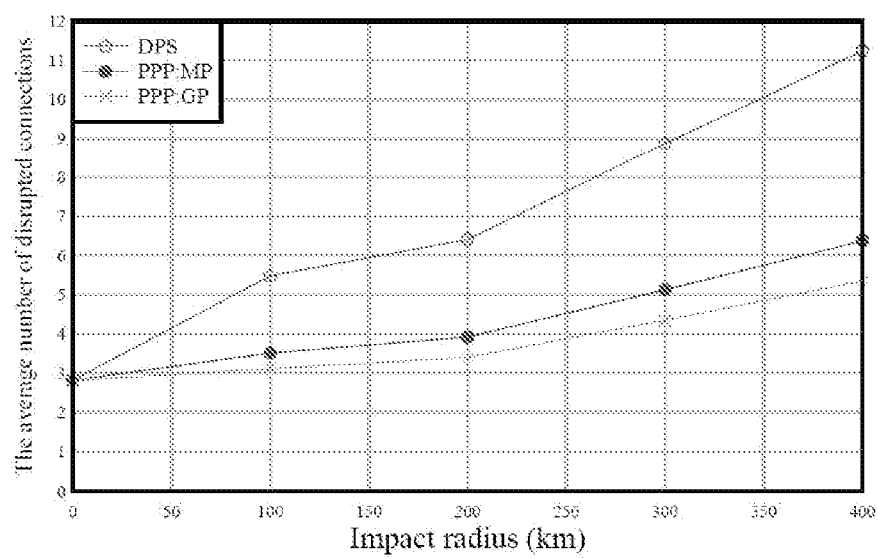
FIG. 4 shows the average number of total disrupted connections according to some embodiments.
Figure 5:
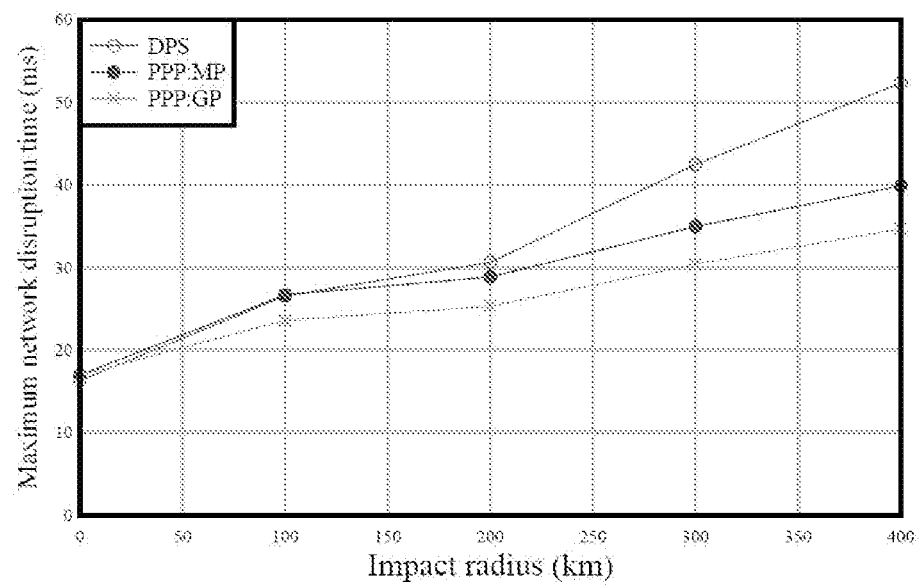
FIG. 5 the average of the maximum disruption time among all the nodes according to some embodiments.

FIG. 4 shows the average number of total disrupted connections. As shown, the number of disrupted connections in accordance with embodiments described herein may be reduced significantly compared to the dynamic path restoration model. By changing the threshold values, the results in the greedy prevention scenario show improvement. FIG. 5 shows the average of the maximum disruption time among all the nodes.

By expanding the impact radius far from the epicentre, network disruption time in the preventive path protection process may be reduced compared to the dynamic path restoration model. A reason may be that traffic of the paths with the higher failure probability may be preventatively switched to the paths with the lower failure probability prior to failure so as not to disrupt through expanding the impact radius.

Maximum network disruption time in the greedy prevention scenario shows more improvement compared to the moderate prevention scenario. In greedy prevention, the preferred candidate paths for the switching scheme had a lower failure probability threshold and utilized more reliable backup paths to reroute traffic.

Figure 6:
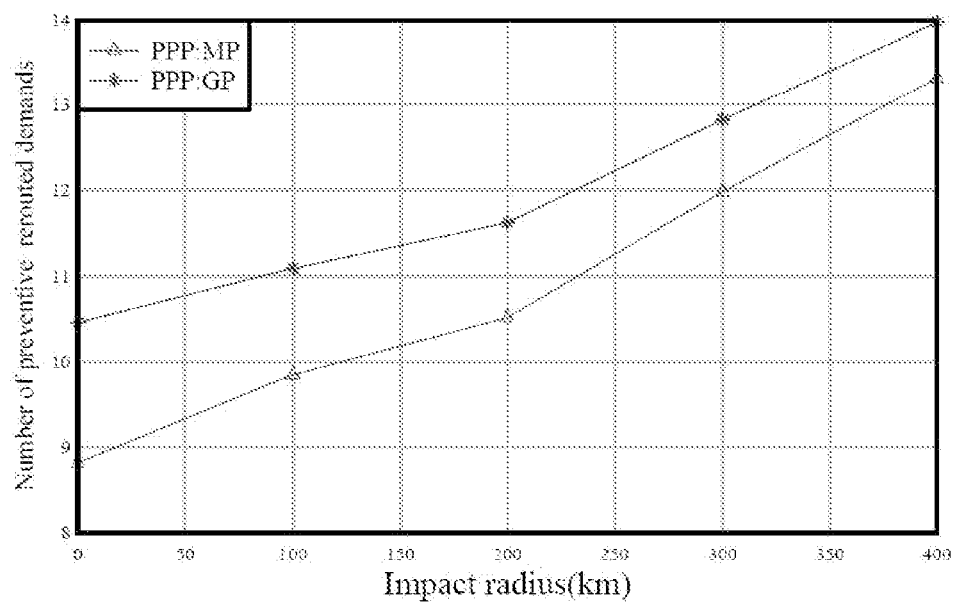
FIG. 6 illustrates the number of rerouted demands in the preventive rerouting model according to some embodiments.

In FIG. 6, we illustrate the number of rerouted demands in the preventive rerouting model. Greedy prevention in the simulation study with upper threshold 50% and lower threshold 25% rerouted more connections compared to the moderate prevention scheme. Based on the network resources and background knowledge of the possible disaster intensity, a proper decision to assign threshold values can increase network resilience to the desired level with the acceptable overload on the network.

Figure 7:
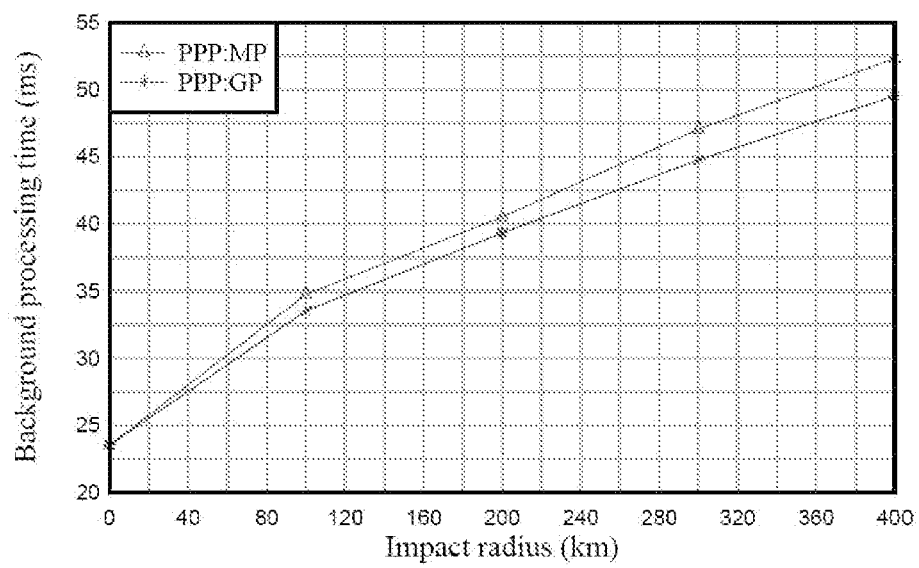
FIG. 7 illustrates preventive paths computing and rerouting time.

Rerouting traffic from endangered paths to the more reliable backup paths will occur as a background process in the network. The switching traffic scheme is a self-determining process developed prior to the failure; however preventive rerouting processes can be time-consuming. FIG. 7 shows the preventive paths computing and rerouting time.

As can be seen, FIG. 7 shows a comparison between the proposed approaches in the form of greedy prevention and moderate prevention. The maximum background processing time employed by the proposed model to calculate appropriate paths and switching traffics prior to failure in the moderate prevention scenario is higher than greedy prevention. It can be deduced that the moderate prevention scenario in this simulation model utilized longer paths to reroute traffic from endangered paths to the regions with the acceptable level of failure probability.

In an aspect, embodiments described herein may improve network survivability in large-scale failure scenarios by implementing a preventive protection process. Embodiments described herein may apply end-to-end path failure probabilities and switching parameters (upper and lower threshold) to reroute endangered traffic through more reliable paths. The obtained results indicate that embodiments described herein may decrease the network disruption time as well as the average number of disrupted connections.

Both improved parameters are important to enhance the level of resilience and ensure undisrupted data delivery in the network.

In addition, different quality of service parameters such as resource optimization and load balancing in the preventive rerouting approach may be used for embodiments.

Exemplary Embodiments of System Implementation

Figure 9:
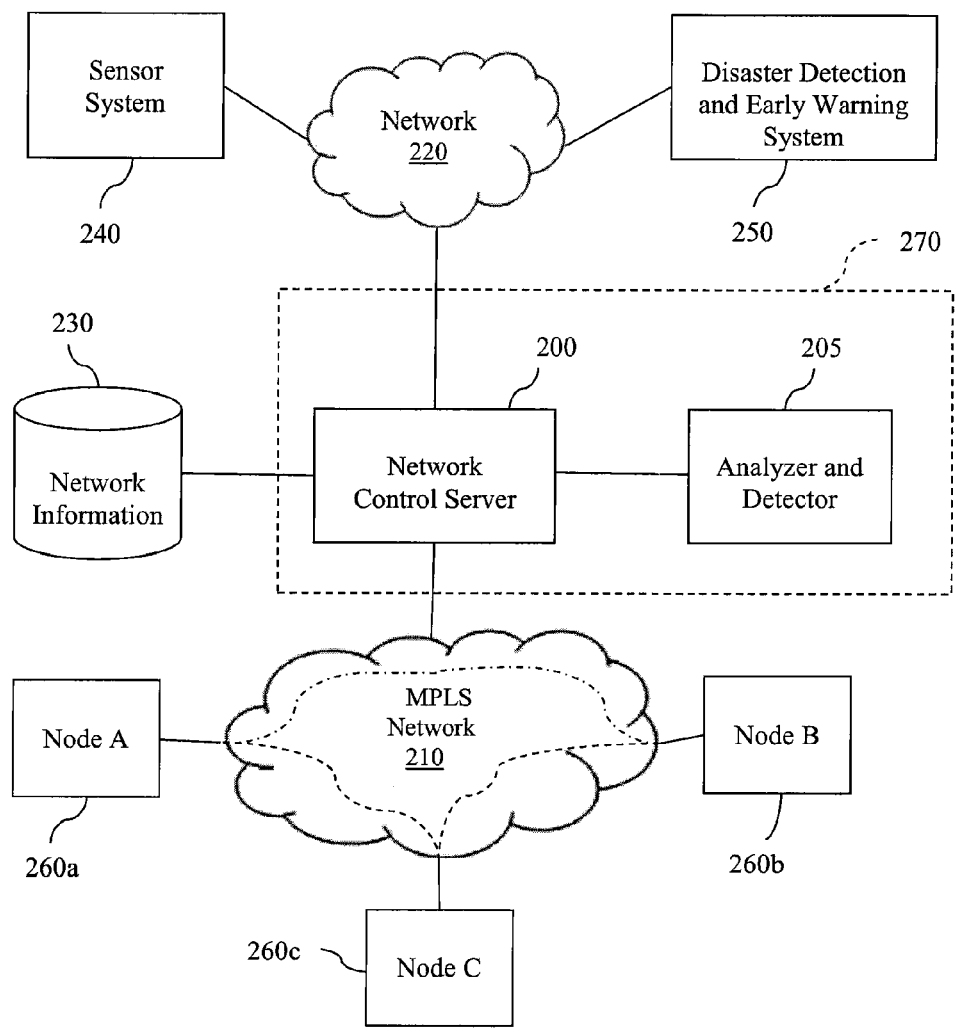
FIG. 9 shows a system diagram of a network control apparatus according to some embodiments.

Referring now to FIG. 9, in accordance with an exemplary embodiment a network control apparatus is described. The network control apparatus can be used as a standalone system or as a sub-system or software module working within, on top, or coupled to larger integrated SDN controller.

FIG. 9 illustrates a Network Control Server 200. Network Control Server 200 may be configured to retrieve and/or receive information from data from Network Information data store 230, which can be a standalone data store or multiple distributed data stores. Network Control Server 200 can monitor and control MPLS Network 210 based on a plurality of network characteristics, including for example, MPLS label data, QoS data, time-to-live values, label switch router (LSR) data, label edge router (LER) data, provider edge (PE) router data, speed of data traffic, number of failed links and/or nodes, number of active links and/or nodes, recovery speed of each previously failed network link or path, types of traffic, network load, determination of network failures, and etc. Network Control Server 200 may also monitor and record connection performance parameters of MPLS Network 210, such as for example, interval or timing of connection verification messages, drop-in bandwidth, jitter or latency, costs, application specific parameters, and traffic specific parameters. Network Control Server 200 can further send such network characteristics and connection performance parameters, collectively referred to as "network connection data", to Network Information data store 230 for storage and later retrieval.

In accordance with some embodiments, Network Control Server 200 may be further connected to a Sensor System 240 and/or a Disaster Detection and Early Warning System 250. Network Control Server 200 may be implemented by a computer system shown in FIG. 8 or a plurality of connected computer systems. The Network Information data store 230 can be part of Network Control Server 200, or it can be a cloud storage element stored on a cloud network or as part of MPLS network 210.

In other embodiments, Network Control Server 200 may be implemented as different hardware components of a communication network in a variety of ways. For example, Network Control Server 200 can be implemented (1) as a client within a network node (e.g. a router, switch, computer, or server, etc.), (2) as a failover system (physical and/or logical, in hardware and/or software), (3) as part of a bonding utility, aggregating utility, or load balancing utility, (4) as part of a phone system, e.g. PBX, telephone, or IP phone, (5) as functionality implemented as part of a network manager, or (6) as part of a communication protocol. This are examples and Network Control Server 200 may have other hardware implementations.

Analyzer and Detector 205 is a processing module that may be implemented by hardware, or a combination of hardware and software components. Analyzer and Detector 205 may be a standalone module, or alternatively it may be implemented as an internal module within Network Control Server 200. Analyzer and Detector 205 can determine, in real-time or substantially or near real-time, if a large-scale network failure has occurred or is about to occur, based on analysis of various network characteristics and/or performance parameters, including but not limited to the above-mentioned network connection data. For example, Analyzer and Detector 205 can detect that a network failure has likely occurred somewhere in MPLS Network 210 by detecting internal error control and network failure messages. In another example, Analyzer and Detector 205 can analyze real-time network connection data or parameters such as connection verification message, drop-in bandwidth, jitter or latency, LSR, LER and/or PE router messages and determine when a network failure has likely occurred.

Network Control Server 200 and Analyzer and Detector 205 may collectively be referred to as Network Controller 270. In accordance with some embodiments, the Network Controller 270 may be an SDN Controller.

Network Controller 270 may control routing of traffic flow for a network of network paths. Each path may be defined by nodes and links. The Network Controller 270 may have a network interface configured to monitor the network to detect large-scale real time network failure indicia to detect likelihood of a network failure involving network paths. The Network Controller 270 also has a routing control processor configured to determine, for each link and node of the network, a probability of failure. The routing control processor is configured, for each failed or likely to fail network path, determine a preventive protection path with a lower probability of failure based on the determined probabilities of failure for the links and nodes. The routing control processor is configured to dynamically reroute network traffic for the failed or likely to fail network path to the preventive protection path. The Network Controller 270 may operate and reroute traffic in a preventative manner prior to detection of network failure. The Network Controller 270 may also operate in disaster recovery mode when network failure has occurred.

MPLS Network 210 can be a Multiprotocol Label Switching (MPLS) telecommunication backbone network provided by a network provider. Alternatively, MPLS Network 210 can be a plurality of MPLS sub-networks provided by one or more network providers. In accordance with some embodiments, MPLS Network 210 may not be an MPLS network, and may be a different type of telecommunication network, such as Generalized MPLS, Shortest Path Bridging (SPB), Provider Backbone Bridges (PBB), or MPLS-TP networks. MPLS Network 210 may also be substituted by an openflow-supported or other types of software-defined networks.

As can be seen, three network Nodes A, B, and C (260a, 260b, 260c) connect to one another via MPLS Network 210. For ease of illustration, Nodes A, B, and C 260a-260c are shown to be outside of MPLS Network 210 in FIG. 9; however, one or more of Nodes A, B, C (260a, 260b, 260c) may be inside MPLS Network 210 as well. Each of the Nodes 260a-260c may be connected to at least one of: a LSR, a LER and/or a PE router. There may be one or more bidirectional network pathways or paths from Node A 260a to each of Node B 260b and Node C 260c, and from Node B 260b to Node C 260c as well. Each of the network paths may be an end-to-end connection between two network nodes, through one or more network links, to satisfy customer demands. Each of the dotted lines connecting Nodes A, B or C (260a, 260b, 260c) to one another represents one possible path within MPLS Network 210. This example shown is illustrative and there may be more paths and each of the paths may consist of a plurality of links and nodes. One or more of such nodes, links, and/or paths may fail due to large-scale network failures.

Sensor System 240 may include a network of sensors capable of monitoring various geographical locations. Sensor System 240 may detect a natural disaster or other incident or event prior to any failure in the network. Sensor System 240 may connect to Network Control System 240 and send sensor data to Network Control Systems 240 in response to detected incidents or events via sensors, such as for example, a possible or incoming natural disaster such as earthquake, tsunami, tornadoes or hurricane. For example, Sensor System 240 may be a large scale system of lightening detectors that can sense and record a variety of real time information about lightning strikes occurring. In another example, Sensor System 249 may be a system of Doppler radar installations, ocean buoys, rainfall gauges, seismographic devices, and/or tri-axial accelerometers (seismometers). Network Control Server 200 can be operable to retrieve or receive information from Sensor System 240 in real time or on a periodic basis, and to determine if a disaster has likely occurred that may impact a communication network such as MPLS Network 210. In another embodiment, Sensor System 240 is also capable of detecting a possible or incoming disaster based on data it has collected via data feeds from internal or external systems, in which event Sensor System 240 may further notify Network Control Server 200 of the incoming disaster event. As shown, Network Control Server 200 may be an aspect of Network Controller 270.

In one embodiment, Network Control Server 200 can detect that a large scale disaster has started (e.g. an earthquake) based on input from Sensor System 240 or network connection results analyzed by Analyzer and Detector 205 or a combination thereof. Network Control Server 200 can further evaluate the speed and predict the range of its impact and take preventive protection actions regarding MPLS Network 210 and possibly other networks while the earthquake is spreading.

Also optionally connected to Network Control Server 200 via network 220, Disaster Detection and Early Warning System 250 functions primarily to warn Network Control Server 200 whenever it has detected a likely event of natural disaster (or man-made disaster such as cyber-attacks or warfare) that is either incoming or is already happening.

It is to be appreciated that besides natural disasters such as earthquake, tsunami, tornadoes or hurricane, cases such as network-based security attacks and cyber warfare, and also EMT attacks can cause large-scale network failures as well. The systems and methods in accordance with embodiments described herein may accommodate all scenarios of large-scale network failure including above cases, as well as wars and meteoroid strikes.

Figure 10:
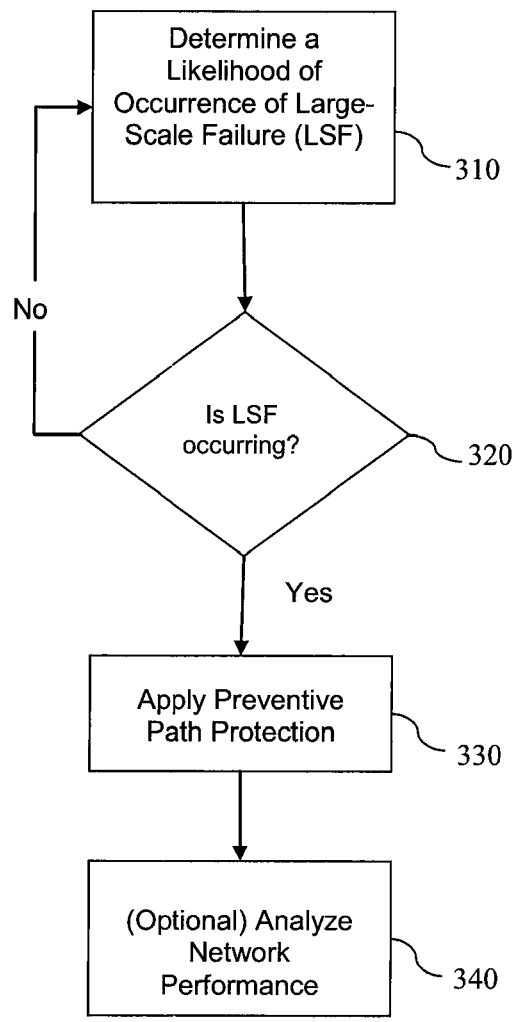
FIG. 10 shows a flow chart of a network control server according to some embodiments.

FIG. 10 illustrates a flow chart of a method that may be implemented by Network Control Server 200, or Network Controller 270 more generally. The method steps may be implemented by a routing processor of Network Control Server 200, or Network Controller 270 more generally.

At step 310, Network Control Server 200 determines if a large-scale network failure is likely occurring or is going to occur very soon. The determination can be made in real time or substantially real time in a number of ways such as, for example:

- by an input from Analyzer and Detector 205 indicating a large-scale network failure may be happening, based on analysis of various network characteristics and/or performance parameters, including but not limited to the above-mentioned network connection data such as network link/path/node failures and/or transmission delays or jitters; in some cases, the reported network link/path/node failures may appear to be correlated in some manner (e.g. location, time, logical connection) and as such may be indicative of a large-scale disaster;
- by a warning signal from Sensor System 240 indicating that a disaster has likely occurred or is likely to occur soon; Sensor System 240 may also send information regarding where the disaster epicenter is and how fast it is spreading.
- by analysis conducted by Network Control Server 200 based on sensor data from Sensor System 240; and/or
- by a warning signal from Disaster Detection and Early Warning System 250 indicating that a disaster has likely occurred or is likely to occur soon. The Disaster Detection and Early Warning System 250 may also send information regarding where the disaster epicenter is and how fast it is spreading.

At step 320, in response to a determining that a large-scale network failure is likely occurring or soon to occur, Network Control Server 200 proceeds to step 330; otherwise, Server 200 can revert to step 310 and keep checking for signs indicating a large-scale network failure.

At step 330, as soon as Network Control Server 200 has determined that a large-scale network failure is likely occurring or soon to occur, the Preventive Path Protection rerouting mechanism can be deployed. Network Control Server 200 can be configured to evaluate the speed of the disaster and to predict which network devices, nodes, routers, paths and/or links are impacted or will be impacted shortly, as the impact range of the disaster expands (in case of for example earthquake) or moves (in case of for example hurricanes and tornados). The Preventive Path Protection may be used to take preventive action for network connections that are in danger within this time.

For the purpose of convenient illustration, the disaster impact area is shown to be circular in the drawings, however embodiments described herein can also be used for non-circular disaster or impact areas. For example, the probability model and method of preventive protection may be customized based on the shape or form of a disaster/impact area, as well as on past experiences.

Two Preventive Path Protections/Preventive Protection processes are illustrated below, each of which may be implemented in embodiments:

---

Preventive protection process 1

While impact radius < maximum radius
   Compute impact area
   For all components within impact area:
      Add failure probability
      Remove failed nodes and links from the network
      Compute end-to-end path failure for each demand
      Based on upper and lower threshold:
         Reroute failed demands to the preventive paths
         Reroute likely to fail demands to the preventive paths
      Calculate number of disrupted connections
      Calculate network disruption time
      Calculate preventive rerouting time
   End For;
   Extend impact radius
End while;

| Preventive protection process 2 |
|---|
| While failure_alarm exists<br>  Estimate disaster parameters (velocity, epicentre, . . .)<br>  Update probabilistic failure model with disaster parameters<br>  Calculate probability of failure for each path/ node/ link within<br>    the next action period T<br>    For each end-to-end network path<br>      If already failed, reroute to a preventive path, if exists<br>      If end-to-end probability of failure > upper threshold<br>        Reroute to a preventive path, if exists<br>      If preventive path does not exist, no preventive action takes<br>        place<br>  Collect new failure alarms<br>End while |

In accordance with one possible embodiment, Preventive Path Protection process 2 as implemented by Network Control Server 200 is described.

A network path can be an end-to-end connection between two network nodes, through one or more network links, to satisfy specific customer demands.

A preventive path can be determined by the following method implemented by Network Control Server 200:

The shortest end-to-end backup path with (probability of failure<lower threshold)

If no path satisfies (1), the shortest end-to-end backup path with (probability of failure<upper threshold)

If no path satisfies (1) or (2), no preventive path is chosen.

As described, a failure alarm may exist as soon as Network Control Server 200 has determined that a large-scale network failure is likely occurring or soon to occur. It may last as long as necessary, for example, it may last until Network Control Server 200 can no longer determine that a large-scale network failure is likely occurring or soon to occur.

Disaster parameters such as energy of the waves, velocity of moving impact, location of epicenter, impact radius, and other geographic characteristics of the impact area may be obtained from Sensor System 240 and/or Disaster Detection and Early Warning System 250 in real time or near real time or substantially real time. In another embodiment, Analyzer and Detector 205 may be configured to calculate disaster parameters based on network connection characteristics and/or network performance/failure data. Alternatively, disaster parameters may be pre-determined or fixed prior to deployment of Preventive Path Protection process by Network Control Server 200 (e.g. network controller).

Once disaster parameters have been obtained, Network Control Server 200 may update probabilistic failure definition (1) and (2) with the disaster parameters including but not limited to velocity of impact wave Vt, decay rate φ, current time t and impact radius Rt. Network Control Server 200 can further calculate probability of failure for each node/link within the next action period T, wherein action period T may be a time period pre-selected by user, or automatically determined by Network Control Server 200 based on disaster parameters.

In one embodiment, end-to-end path failure probability can be computed by Network Control Server 200 in accordance with the network definition described herein. For example, the end-to-end path failure probability can be computed by model formula (1) and (2) reproduced below:

$$P_f(R, t) = e^{-\varphi(Rt/Vt)} \quad (1)$$

$$P_f(\text{path}_{(i,j)}) = 1 - \prod_{e_{ij} \in E} (1 - P_f^{ij}(R_t)) \quad (2)$$

Depending on the network topology and epicentre of the disaster, several alternative paths from the source (e.g. Node A 260*a*) to the destination (e.g. Node B 260*b*) may be available for each affected connection. In this step, the existing k-shortest paths are computed and the output may be sorted with the shortest path first. For each source node i and destination node j a group of shortest paths may be defined as:

path(i,j)$_1$, path(i,j)$_2$, . . . , path(i,j)$_k$

Using equation (2), the end-to-end probability of failure for each path can be calculated as:

$P_f(\text{path}_{(i,j)})_1$, $P_f(\text{path}_{(i,j)})_2$, . . . , $P_f(\text{path}_{(i,j)})_k$ For each end-to-end network path, a failure probability is thus determined by Network Control Server 200 or Network Controller 270. Depending on the determined failure probability, the following options may be chosen by Network Control Server 200 or Network Controller 270:
For each end-to-end network path
If already failed, reroute to a preventive path, if exists
  If end-to-end probability of failure>upper threshold
    Reroute to a preventive path, if exists
  If preventive path does not exist, no preventive action takes place In order to determine a preventive path (if it exists), two decision making parameters may be defined: upper threshold and lower threshold. These parameters can be used to determine an appropriate decision to switch traffic from the in-danger path prior to failure. Lower threshold can be defined as T_low∈[0,1] and upper threshold as T_up∈[0,1]. T_low can define a zone for the paths with lower end-to-end probability of failure, therefore having more chances to survive the impact.

The following describes the decision making procedure based on the end-to-end path failure probability:

$P_f(\text{path}_{(i,j)})_1 \leq T\_\text{low}$

In this situation, the first computed shortest path has a lower failure probability than the lower threshold. We assume this path falls in the safe zone and can be selected as an available backup path to route traffic.

$P_f(\text{path}_{(i,j)})_1 \geq T\_\text{up}$

The end-to-end probability of failure may be higher than the upper threshold, which means that the path is likely to fail in the future. The proper action is to find another shortest path in the lower threshold zone and reroute the demands through it. If the proposed model could not find a path in the lower threshold zone, any path with a lower failure probability than the current path may be selected to reroute the traffic.

$T\_\text{up} < P_f(\text{path}_{(i,j)})_1 < T\_\text{low}$

In this scenario, the first found shortest path remains as the working path. The difference between upper threshold and lower threshold can be chosen based on the desired level of survivability and the available resources in the network.

In all of the above scenarios, if the number of available k-shortest paths is one, it may be considered as the best candidate path. Having several shortest paths is directly related to the network topology and the failure intensity. In highly damaged networks, more links and nodes will fail and as a result, less network resources will be available to reroute traffic.

The process of selecting a preventive path, if it exists, and rerouting an end-to-end network path based on its failure probability can be repeated for each network end-to-end-path or link by Network Control Server 200 or by Network Controller 270, until the failure alarm ceases to be in effect or is otherwise terminated.

In another embodiment in accordance with another aspect, Network Control Server 200 or Network Controller 270 can actively calculate an end-to-end path failure probability for each path in an impact radius all the time, and rerouting links or paths based on T_low and T_up, whether or not a disaster is in fact predicted or detected. Such assessment can be done, for example, by using average mean-time-to-failure and estimating probabilities of failure for each network node, link, path or device, based on network performance data monitored in real-time. Therefore, Preventive Path Protection process may be implemented in the background of a network such as MPLS network 210, and can be rerouting failed links (or paths) or close-to-failure links (or paths) in real-time as each link or path fails or comes close to failure, whether a natural disaster or a large-scale network failure is detected.

At step 340, Network Control Server 200 or Network Controller 270 can optionally analyze network performance of MPLS Network 210 during and/or after deployment of Preventive Path Protection.

The Network Control Server 200 or Network Controller 270 may be implemented using various hardware configurations. A suitably configured computer device or software defined network controller, and associated communications networks, devices, software and firmware may provide a platform for enabling one or more embodiments as described above.

Figure 8:
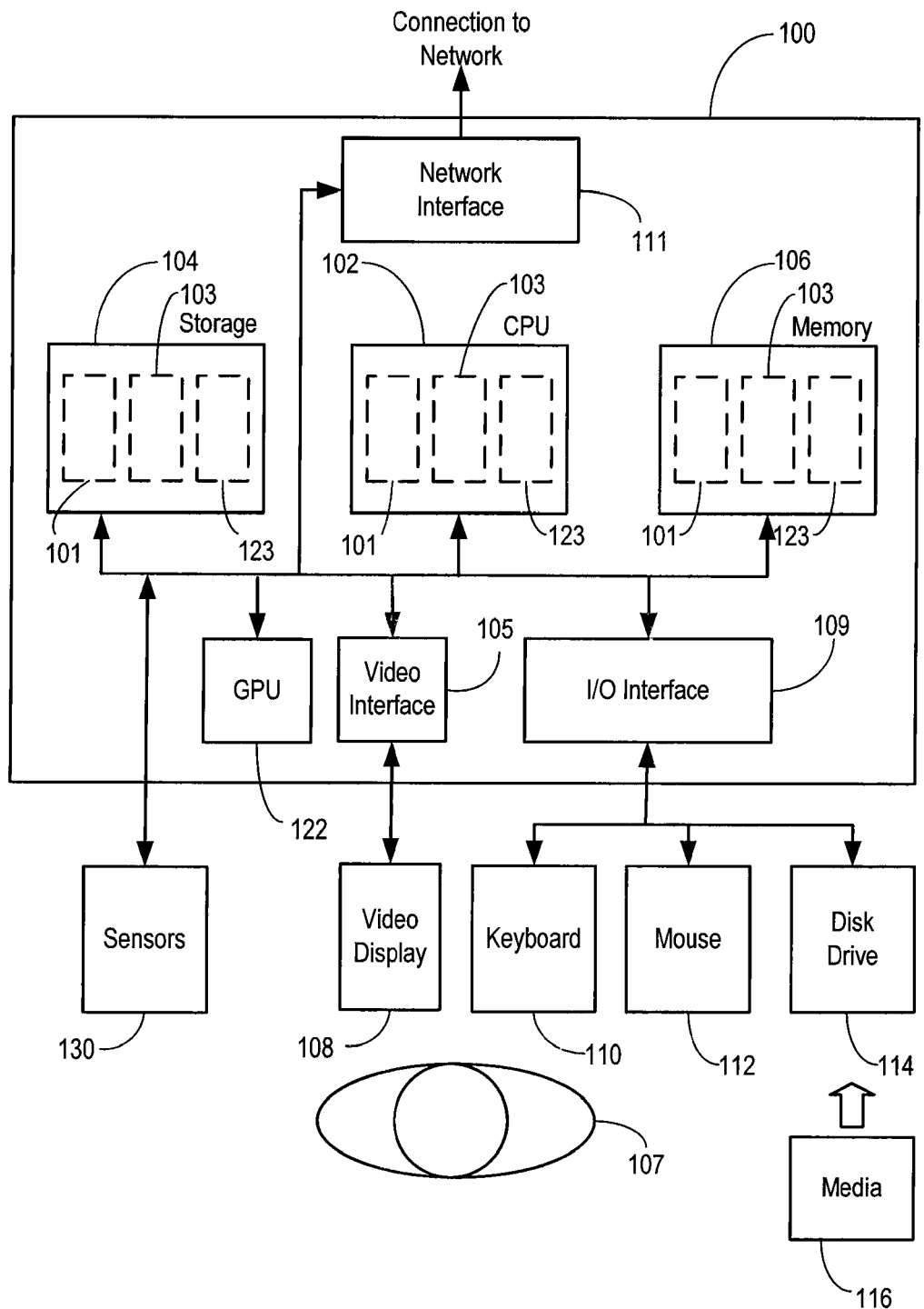
FIG. 8 shows a computer device implementation for aspects of a computer server according to some embodiments.

By way of example, FIG. 8 shows a computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). Each of the primary computer server 10, secondary computer server(s) 20, and client computer 30 may be implemented as an instance of the computer device 100. Computer device 100 may be used to implemented a portion of Network Control Server 200 or Network Controller 270 with particularly configured hardware modules.

In further aspects, the disclosure provides systems, devices, methods, and computer programming products, including non-transient machine-readable instruction sets, for use in implementing such methods and processes, and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in various example embodiments, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may provide an improved communication network that transforms physical link routes between nodes dynamically in response to preventative path calculations. The network controller enables improved network usage and dynamic re-routing in real time. The network controller efficiently uses processing resources for the preventative path calculations.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a nonvolatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For simplicity only one network controller 270 is shown but system may include more network controller 270 to serve multiple networks 220. The network controller 270 includes at least one processor at least one a data store, and at least one communication interface. The network controller 270 components may be connected in various ways including directly coupled, indirectly coupled via a network, and distributed over a wide geographic area and connected via a network (which may be referred to as "cloud computing"). The network controller 270 is capable of being configured to carry out the methods and processes described herein.

Network controller 270 includes a routing processor which may include a processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Network controller 270 may include computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Network controller 270 has a network interface in order to communicate with other components, to exchange data with other components, to access and connect to network resources, to serve applications, and perform other computing applications by connecting to a network (or multiple networks) 220.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only.

What is claimed is:

1. A network controller for a network of network paths defined by nodes and links comprising:
    a network interface configured to monitor the network to detect large-scale real time network failure indicia to detect likelihood of a network failure involving one or more network paths; and
    a routing control processor configured to determine, for each link and node of the network, a probability of failure, and, for each failed or likely to fail network path, determine a preventive protection path with a lower probability of failure based on the determined probabilities of failure for the links and nodes, and dynamically reroute network traffic for the failed or likely to fail network path to the preventive protection path, wherein the routing control processor is further configured to, for each network path determined to have already failed or likely to fail, calculate a shortest preventative path with a probability of failure less than a threshold limit, and reroute network traffic for the failed or likely to fail network path to the shortest preventative path.

2. The network controller of claim 1, wherein the routing control processor is further configured to:
    calculate disaster parameters using data feeds from one or more sensors, and update a probabilistic failure model with the disaster parameters;
    determine the probability of failure for each node or link of the network using the updated probabilistic failure model; and
    determine a future risk of failure for each network path in the network using the updated probabilistic failure model and the probabilities of failure; and
    mitigate failure impact by rerouting by based on the future risk of failure for each network path.

3. The network controller of claim 1, wherein the shortest preventative path has a probability of failure less than an upper threshold limit.

4. The network controller of claim 1, wherein the shortest preventative path has a probability of failure less than an upper threshold limit and a lower threshold limit.

5. The network controller of claim 1, wherein the routing control processor is configured to determine an impact area using the detected large-scale real time network failure indicia, determine the probability of failure for each link or node of the network within the impact area, and reroute one or more network paths within the impact area to preventative paths.

6. The network controller of claim 1, wherein the routing control processor is configured to update the impact area as failure in a large-scale scenario expands over time, update the probability of failure for each link or node of the network within the updated impact area, and reroute the one or more network paths within the updated impact area to preventative paths.

7. The network controller of claim 1, wherein the routing control processor is configured to evaluate network performance by calculating a number of disrupted connections, a disruption time, and a rerouting time for a network failure event.

8. The network controller of claim 1, wherein the routing control processor is configured to compute, once network failure is detected or likely, a failure decay rate based on a level of intensity of the network failure and geographical characteristics for the network failure, and determine the probabilities of failure using the failure decay rate.

9. The network controller of claim 1, wherein the routing control processor is configured to actively and continuously calculate, for each network path in an impact radius, an end-to-end path failure probability using the probabilities of failure for the links and nodes, and reroute traffic for the network paths based on one or more threshold values and the end-to-end path failure probabilities, whether or not failure is predicted or detected.

10. The network controller of claim 1, wherein the routing control processor is configured to calculate for each source node and destination node in the network, a shortest preventative path and reroute network traffic prior to network failure detection.

11. The network controller of claim 10, wherein the routing control processor is further configured to reroute network traffic prior to network failure detection based on one or more threshold values and end-to-end path failure probabilities.

12. A system for preventative network path rerouting comprising:
  a network of network paths defined by nodes and links;
  a plurality of sensors to monitor the network to collect large-scale real time network failure indicia; and
  a network controller for the network comprising:
    a network interface configured to monitor the plurality of sensors for the large-scale real time network failure indicia; and
    a routing control processor configured to determine, for each link and node of the network, a probability of failure, and, for each failed or likely to fail network path, determine a preventive protection path with a lower probability of failure based on the determined probabilities of failure for the links and nodes, and dynamically reroute network traffic for the failed or likely to fail network path to the preventive protection path, wherein the routing control processor is further configured to, for each network path determined to have already failed or likely to fail, calculate a shortest preventative path with a probability of failure less than a threshold limit, and reroute network traffic for the failed or likely to fail network path to the shortest preventative path.

13. A disaster recovery controller in a network of nodes connected by links, wherein the controller is configured to execute the following process in a loop:
  determine likelihood of occurrence of a large scale failure through communication with a network node or a sensor for disaster detection
  compute network failure parameters for range of impact and speed of expansion based on failure indicia received from the network node or the sensor;
  compute impact area using the network failure parameters to define a set of network paths for rerouting;
  for each network path, rerouting data flow to a shortest preventative path having a probability of failure less than a threshold limit; and
  continuously monitoring the network for further failure updates and re-execution of process.

14. The disaster recovery controller of claim 13, further configured to:
  calculate disaster parameters using data feeds from received from the network node or the sensor, and update a probabilistic failure model with the disaster parameters and network failure parameters; and
  determine the probability of failure for each node or link of the network using the updated probabilistic failure model.

15. The disaster recovery controller of claim 13, further configured to, for each network path for rerouting, calculate a shortest preventative path with a probability of failure less than a threshold limit, and reroute network traffic for the network path to the shortest preventative path.

16. The disaster recovery controller of claim 15, wherein the shortest preventative path has a probability of failure less than an upper threshold limit.

17. The disaster recovery controller of claim 15, wherein the shortest preventative path has a probability of failure less than an upper threshold limit and a lower threshold limit.

18. The disaster recovery controller of claim 13, further configured to determine the impact area using the detected large-scale real time network failure indicia, determine the probability of failure for each link or node of the network within the impact area, and reroute one or more network paths within the impact area to preventative paths.

19. The disaster recovery controller of claim 13, further configured to evaluate network performance by calculating a number of disrupted connections, a disruption time, and a rerouting time for a network failure event.

20. The disaster recovery controller of claim 13, further configured to compute, once network failure is detected or likely, a failure decay rate based on a level of intensity of the network failure and geographical characteristics for the network failure, and determine the probabilities of failure using the failure decay rate.

\* \* \* \* \*